United States Patent [19]

Kita et al.

[11] Patent Number: 5,542,809
[45] Date of Patent: Aug. 6, 1996

[54] SELF-DRIVEN LIFTUP CONVEYOR, VEHICULAR LIFTUP CONVEYOR, TRUCK FREIGHT LOADER/UNLOADER, AND TRUCK FREIGHT LOADING SYSTEM

[75] Inventors: Katsuo Kita, Settsu; Yasushi Nagamune, Taki-gun; Yasuyuki Nakadegawa, Tokyo, all of Japan

[73] Assignees: Ashimori Kogyo Kabushiki Kaisha, Osaka; Nippon Light Metal Company, Limited, Tokyo, both of Japan

[21] Appl. No.: 338,537

[22] Filed: Feb. 9, 1995

[30] Foreign Application Priority Data

Apr. 7, 1993 [JP] Japan .................................. 5-106131
Dec. 14, 1993 [JP] Japan .................................. 5-342943

[51] Int. Cl.⁶ .................................. B60P 1/36; B60P 1/52
[52] U.S. Cl. .......................... 414/528; 414/529; 414/535; 198/809
[58] Field of Search .................................. 414/528, 529, 414/531, 532, 535; 198/721, 809; 193/35 SS

[56] References Cited

U.S. PATENT DOCUMENTS

| | | | |
|---|---|---|---|
| 2,693,286 | 11/1954 | Cocks | 414/535 |
| 3,905,494 | 9/1975 | Yatagai et al. | 414/528 X |
| 4,293,065 | 10/1981 | Dyer et al. | 198/809 X |
| 4,844,684 | 7/1989 | Bradley | 414/529 X |
| 4,887,937 | 12/1989 | Thunnissen | 414/529 X |
| 4,909,378 | 3/1990 | Webb | 414/529 X |
| 4,966,515 | 10/1990 | Van Niekerk | 414/528 |
| 4,967,894 | 11/1990 | Thunnissen | 193/35 SS |

FOREIGN PATENT DOCUMENTS

| | | | |
|---|---|---|---|
| 0002106 | 5/1979 | European Pat. Off. | 198/809 |
| 0268323 | 5/1988 | European Pat. Off. | 414/528 |
| 2543164 | 4/1976 | Germany | 414/529 |
| 8702129 | 4/1989 | Netherlands | 414/531 |

Primary Examiner—James W. Keenan
Attorney, Agent, or Firm—Oblon, Spivak, McClelland, Maier & Neustadt, P.C.

[57] ABSTRACT

A self-driven liftup conveyor comprises a channel including a bottom plate and two side plates; a roller tray accommodated in the channel and holding a multiplicity of rollers in a rotatable manner; a belt placed all over the length of the rollers; a drive mechanism for reciprocating the belt; and a lift mechanism interposed between the roller tray and the channel for moving the roller tray together with the belt on the rollers vertically with respect to a freight stacking face. A vehicular liftup conveyor is constructed by placing that self-driven liftup conveyor and ordinary liftup conveyors in parallel on the truck bed. A truck freight loader/unloader is constructed by placing the self-driven liftup conveyor and the ordinary liftup conveyors in parallel on a platform to be connected to the truck bed. A truck freight loading system is constructed by combining the truck freightloader/unloader and the truck bed having an ordinary liftup conveyor mounted thereon.

10 Claims, 10 Drawing Sheets

SELF-DRIVEN LIFTUP CONVEYOR, VEHICULAR LIFTUP CONVEYOR, TRUCK FREIGHT LOADER/UNLOADER, AND TRUCK FREIGHT LOADING SYSTEM

TECHNICAL FIELD

The present invention relates to a self-driven liftup conveyor capable of moving up and down from a freight stacking face and conveying freights when it moves up. The present invention further relates to a vehicular liftup conveyor for automating the conveyance of freights in the bed of a truck by applying the self-driven liftup conveyor to the truck bed. The present invention further relates to a truck freight loader/unloader for automating the conveyance of freights to the bed of a truck by applying the self-driven liftup conveyor to the freight loader/unloader to be connected to the truck bed. The present invention further relates to a truck freight loading system for automating the conveyance of freights by using the truck freight loader/unloader.

BACKGROUND ART

In case a van type truck is to have its bed loaded with freights in the prior art, there has been generally performed a loading method called "manual loading", in which the freights on a pallet are transported to the entrance of the bed by a fork lift and are manually conveyed and loaded on a predetermined position on the bed. This manual loading method is troublesome and requires a large amount of labor in moving the freights in the bed.

In order to facilitate the movement of freights in the bed of a truck, therefore, the truck bed is provided with a liftup conveyor, as disclosed in Japanese Patent Laid-Open No. 53907/1989. This liftup conveyor is equipped with free roller rows which can move up and down from a freight stacking face. When the freights are to be stacked and then moved on the bed, the free roller rows are lifted from the freight stacking face and the freights rolled on the free roller rows until they are loaded in a predetermined position in the bed. While the truck is running, on the other hand, the free roller rows are lowered from the freight stacking face so that the freights are stably placed without any slip on the freight stacking face. Specifically, this liftup conveyor is provided for lifting the free roller rows from the freight stacking face, when the freights are to be loaded or unloaded, to ensure the smooth conveyance of freights to facilitate the movement of freights in the bed.

If, however, this liftup conveyor is applied to the bed of a truck, the man power can be considerably spared, as compared with the manual loading, but the freights themselves have to be manually pushed in the truck bed at the freight loading/unloading time. Thus, there is left a problem that the freights cannot be automatically loaded/unloaded. Moreover, two or more operators are required for transporting the freights to the entrance of the bed by the fork lift at the loading time and for manually pushing the freights on the bed to roll them on the free roller rows. If these working operations are to be performed by a single operator, the operator has to push the freights by hand on the bed after he has driven the fork lift. Thus, there is left a problem that the loading operation of freights takes a long time and a large amount of labor.

As disclosed in Japanese Utility Model Laid-Open No. 41451/1989, therefore, there has been proposed a wide belt conveyor structure, in which a wide belt is arranged all over the surface of the freight stacking face of a truck bed so that it may be slipped on the freight stacking face by take-up means disposed at the front or rear portion of the to convey the freights sequentially forward on the belt.

If this wide belt conveyor is applied to the truck bed, the freights can be automatically moved in the bed after they have been transferred to the bed by the fork lift. However, the wide belt has to be moved while bearing the total weight of the freights, so that the belt receives a serious load to require large-scaled drive means. This large scale raises a problem that the system has its total weight and whole volume enlarged to reduce the carrying capacity accordingly. Still the worse, the weight of the freights is continuously applied while the truck is running, so that the belt is liable to wear.

DISCLOSURE OF INVENTION

In order to solve the above-specified problems, the present invention has a first object to provide a self-driven liftup conveyor which has a simple structure but can function as a self-driven conveyor at the freight loading/unloading time and can be made independent from the weight of the freights when the freights are stacked on a truck bed.

A second object of the present invention is to provide a vehicular liftup conveyor which is brought into a preferable mode by applying the self-driven liftup conveyor to the bed of a truck.

A third object of the present invention is to provide a truck freight loader/unloader which is brought into a preferable mode by applying the self-driven liftup conveyor to a loader/unloader to be connected to the bed of a truck.

A fourth object of the present invention is to provide a truck freight loading/unloading system capable of loading the truck bed automatically with freights.

In order to achieve the first object, there is provided a self-driven liftup conveyor comprising: a channel including a bottom plate and two side plates; a roller tray accommodated in said channel and holding a multiplicity of rollers in a rotatable manner; a belt placed all over the length of said rollers; drive means for reciprocating said belt; and lift means interposed between said roller tray and said channel for moving said roller tray together with said belt on said rollers vertically with respect to a freight stacking face. At the freight loading/unloading time, said roller tray is protruded from the freight stacking face by said lift means so that the freights are moved by reciprocating the belt by said drive means. While the freights are not moved, said roller tray is sunk from the freight stacking face by said lift means. As a result, the freights have its load applied only while they are moving, so that the belt can have its durability improved.

From the standpoint of reducing the size, said lift means may preferably include an airtight tubular bag placed on the bottom plate of said channel for raising or lowering said roller tray by charging the inside of said airtight tubular bag with compressed air or discharging the compressed air. From the size reducing standpoint, moreover, said belt may preferably be an endless belt for running in said roller tray. In order to thread the backward half of said endless belt, furthermore, said roller tray may preferably include a main tray for holding said multiple rollers in a rotatable manner, and a sub tray placing said main tray removably thereon, and wherein said endless belt has its backward half made to run between said sub tray and said main tray. From the standpoint of driving said endless belt while absorbing its slackness which may result from the vertical movements, said drive means may preferably include a drive roller and a pressure roller adapted to come into and out of contact with said drive roller, and wherein said endless belt has its backward half made to run on said drive roller and said pressure rollers. From the standpoint of facilitating the maintenance of the endless belt, furthermore, said drive roller may have only its one end rotatably borne by a bearing.

In order to achieve the second object, there is provided a vehicular liftup conveyor comprising: a liftup conveyor mounted on the bed of a truck; and a self-driven liftup conveyor mounted on said bed along said liftup conveyor, wherein said self-driven liftup conveyor includes: a channel having a bottom plate and two side plates; a roller tray accommodated in said channel and holding a multiplicity of rollers in a rotatable manner; a belt placed all over the length of said rollers; drive means for reciprocating said hell; and lift means interposed between said roller tray and said channel for moving said roller tray together with said belt on said rollers vertically with respect to a freight stacking face, and wherein said liftup conveyor includes: a channel having a bottom plate and two side plates; a roller tray accommodated in said channel and holding a multiplicity of rollers turnably; and lift means interposed between said roller tray and said channel for moving said roller tray vertically with respect to said freight stacking face.

Specifically, the liftup conveyors of the prior art and said self-driven liftup conveyor are arranged in parallel on the bed of a truck so that the freights may be conveyed by the self-driven liftup conveyor while having their load borne by the liftup conveyors, to improve the durability of the belt.

From the standpoint of manually pushing the freights by said liftup conveyors, the lift means of said self-driven liftup conveyor and the lift means of said liftup conveyor can preferably operate independently of each other. From the standpoint of reducing the size, furthermore, the lift means of said self-driven liftup conveyor and the lift means of said liftup conveyor may preferably have airtight tubular bags placed on the bottom plate of said channel for raising or lowering said roller tray by charging the insides of said airtight tubular bags with compressed air or discharging the compressed air. From the standpoint of minimizing the load upon the belt, furthermore, the lifting force of the airtight tubular bag of said liftup conveyor is preferably set stronger than that of the airtight tubular bag of said self-driven liftup conveyor.

In order to achieve the third object of the present invention, there is provided a truck freight loader/unloader comprising: a platform positioned to be connected to the bed of a truck; a conveyor mounted on said platform; and a self-driven liftup conveyor mounted on said platform along said conveyor, wherein said self-driven liftup conveyor includes: a channel having a bottom plate and two side plates; a roller tray accommodated in said channel and holding a multiplicity of rollers in a rotatable manner; a belt placed all over the length of said rollers; drive means for reciprocating said belt; and lift means interposed between said roller tray and said channel for moving said roller tray together with said belt on said rollers vertically with respect to a freight stacking face.

Specifically, the freights of one truck can be loaded on or unloaded from the bed at once if the truck freight loader/unloader is used. As a result, the freights can be transported to the truck within a short time period to shorten the standby time of the truck, and can be transported for a spare time to the truck loader/unloader by using said conveyor means.

In order to leave the freights stably on the freight loader/unloader, moreover, said conveyor is preferably a liftup conveyor including: a channel having a bottom plate and two side plates; a roller tray accommodated in said channel and holding a multiplicity of rollers in a rotatable manner; and lift means interposed between said roller tray and said channel for moving said roller tray vertically with respect to a freight stacking face. In order to match the level of the truck bed, furthermore, said platform to be connected to the bed of said truck is preferably made tiltable.

In order to achieve the fourth object of the present invention, there is provided a freight loading system comprising: a truck bed; a freight loader/unloader to be connected to said bed; and conveyor means for conveying freights to said freight loader/unloader, wherein there is mounted on said bed a liftup conveyor including: a channel having a bottom plate and two side plates; a roller tray accommodated in said channel and holding a multiplicity of rollers turnably; and lift means interposed between said roller tray and said channel for moving said roller tray vertically with respect to said freight stacking face, wherein there is mounted on said freight loader/unloader a self-driven liftup conveyor including: a channel having a bottom plate and two side plates; a roller tray accommodated in said channel and holding a multiplicity of rollers in a rotatable manner; a belt placed all over the length of said rollers; drive means for reciprocating said belt; and lift means interposed between said roller tray and said channel for moving said roller tray together with said belt on said rollers vertically with respect to a freight stacking face, wherein a conveyor is placed along said self-driven liftup conveyor, and wherein the freights from said freight conveyor means are stocked for one track or more in said loader/unloader and are conveyed altogether to the bed of said truck by the self-driven liftup conveyor of said freight loader/unloader until they are conveyed to the front of said bed by the liftup conveyor of said bed.

Specifically, if said self-driven liftup conveyor is mounted on the beds of all trucks, the cost rises. If, therefore, the bed is provided with only the liftup conveyors whereas the freight loader/unloader is provided with the self-driven liftup conveyor, it is possible to construct a system capable of automating the freight loading/unloading operations at a reasonable cost as a whole.

BEST MODE FOR CARRYING OUT THE INVENTION

Here will be described a vehicular liftup conveyor using the self-driven liftup conveyor described above according to the present invention, with reference to the accompanying drawings.

Figure 1:
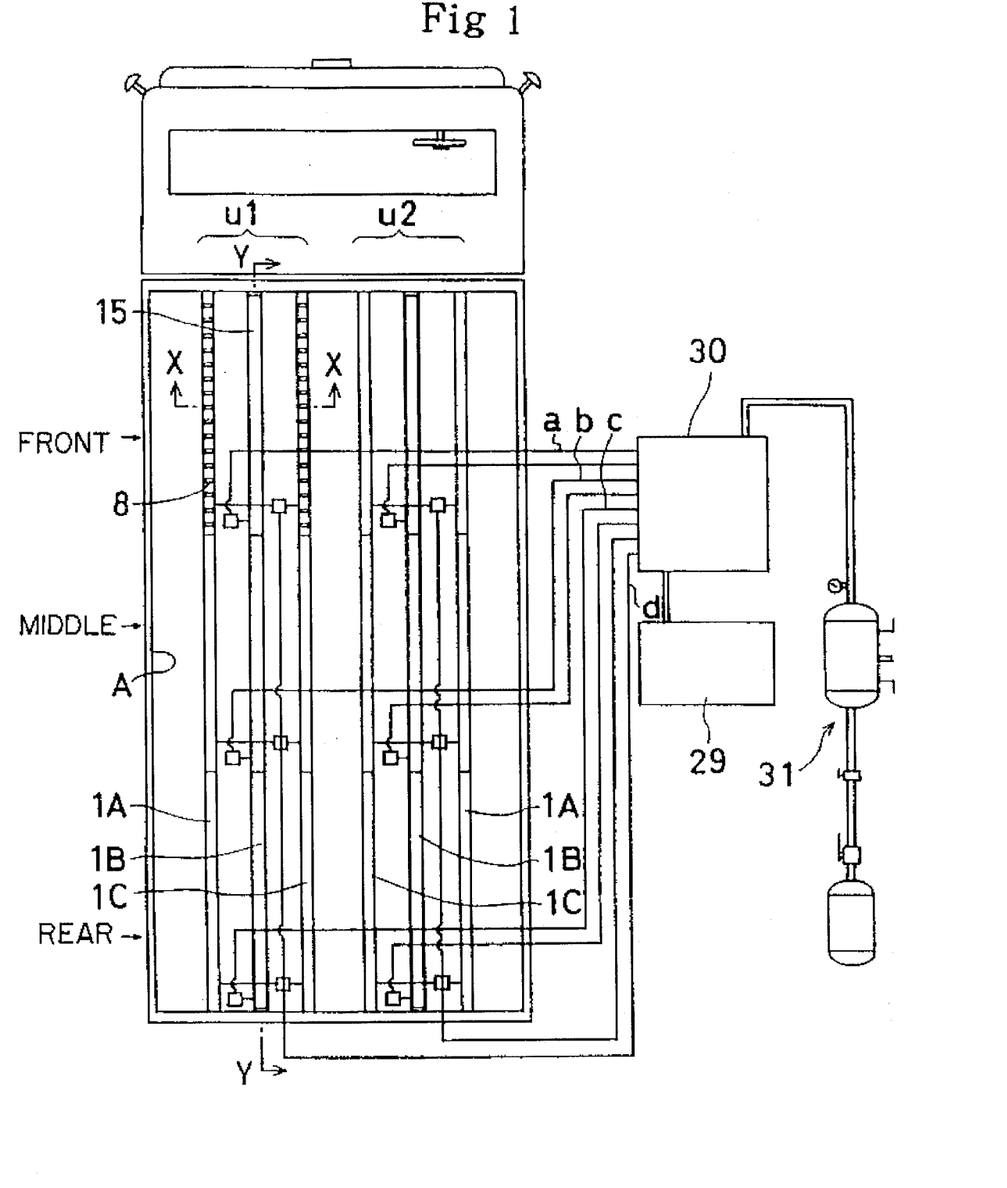
FIG. 1 is a top plan view showing a truck bed on which is placed a vehicular liftup conveyor using a self-driven liftup conveyor of the present invention.

In FIG. 1, reference characters U1 and U2 designate vehicular liftup conveyors which are longitudinally laid on a truck bed A. Each of these vehicular liftup conveyors U1 and U2 is constructed to include: a self-driven liftup conveyor 1B and free liftup conveyors 1A and 1C disposed along the two sides of the former liftup conveyor 1B.

On the self-driven liftup conveyor 1B, there is made to run a belt 15 which is raised out of or sunk into a freight stacking face by either charging a later-described airtight tubular bag with pressure air or discharging the air. The liftup conveyors 1A and 1C are composed of free roller rows which are arrayed with numerous rollers 8 and which are also raised out of or sunk into the freight stacking face by charging the airtight tubular bag with the pressure air or discharging the air. Moreover, the self-driven liftup conveyor 1B and the free liftup conveyors 1A and 1C include three airtight tubular bags respectively which are arrayed longitudinally in series at front, middle and rear lines. Incidentally, the three front, middle and rear airtight tubular bags of the free liftup conveyors 1A and 1B are connected in series by piping members such as synthetic resin tubes.

Moreover, air pipes a, b and c for the three front, middle and rear airtight tubular bags of the self-driven liftup conveyor 1B and an air pipe d for the airtight tubular bags of the free liftup conveyors 1A and 1C are connected to an air control unit 30. This air control unit 30 is so controlled by a control box 29 that it can charge the desired airtight tubular bag with the compressed air under a desired pressure or discharge the air. Here will be described the construction of the self-driven liftup conveyor 1B with reference to FIGS. 2 and 3. This self-driven liftup conveyor 1B is constructed to include a channel 2, an airtight tubular bag 3, a roller tray 4, a belt 15 and drive means 19 as its major components. The channel 2 in the self-driven liftup conveyor 1B of FIG. 1 is formed into a generally D-shaped section having a bottom plate 5c and side plates 5a and 5b erected from the two sides of the bottom plate 5c. Moreover, the side plates 5a and 5b are formed on the upper portions of their inner faces with stoppers 6a and 6b which are extended all over the length of the channel 2 while having different heights. The airtight tubular bag 3 is arranged on the entire length of the bottom plate 5c.

Figure 2:
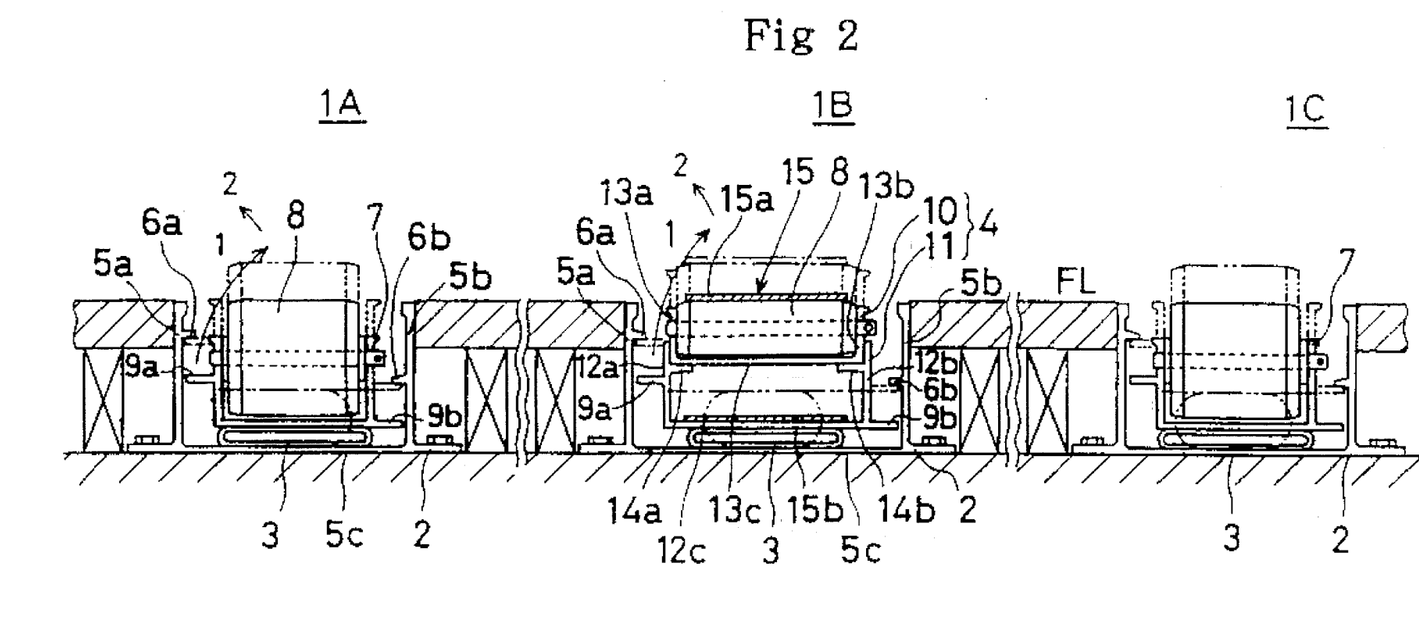
FIG. 2 is a section taken along line X—X of FIG. 1.

The airtight tubular bag 3 thus functioning as lift means is made so flexible that it can be folded, and has its two end portions closed by suitable means such as an adhesive or clamp but is formed in its portion with an air vent. Specifically, the airtight tubular bag 3 is made of a tubular woven fabric which is formed by weaving warp and weft and which has its inner face lined with soft rubber or a synthetic resin. More preferably, the airtight tubular bag 3 may have a double structure having another tubular fabric which is formed by weaving warp and weft. This double structure can protect the airtight tubular bag 3 against the damage to have an excellent durability.

Incidentally, this lift means resorting to the expansion of that airtight tubular bag 3 could be replaced by another lift means having short hydraulic boosters between the channel 2 and a later-described roller tray. This lift means could be modified by providing the channel 2 with cams having slopes such as those of right-angled triangles and by providing the later-described roller tray with cam followers adapted to ride on the slopes of the cams so that the roller tray may be raised or sunk in its entirety by sliding it horizontally by the action of a hydraulic cylinder. Despite these possible modifications for the lift means, however, the aforementioned airtight tubular bag 3 is preferable because it can be flattened, while it is out of use, to reduce the total height.

The roller tray 4 is accommodated in the channel 2 and is constructed to include a main tray 10 and a sub tray 11. Of these, the main tray 10 is formed into a generally U-shaped section having a bottom plate 13c and two side plates 13a and 13b erected from the two sides of the bottom plate 13c. The numerous rollers 8 are so arrayed in the row between the side plates 13a and 13b as to freely turn. On the other hand, the sub tray 11 is formed into a generally U-shaped section having a bottom plate 12c and two side plates 12a and 12b erected from the two sides of the bottom plate 12c. The side plates 12a and 12b are formed on their outer faces with retaining portions 9a and 9b which are projected all over the length of the sub tray 11 for engaging with the aforementioned stoppers 6a and 6b to regulate the raised position of the roller tray 4. On the other hand, the inner faces of the side plates 12a and 12b are formed on their upper portions with shelves 14a and 14b which are extended at the same height all over the length of the sub tray 11. Moreover, the main tray 10 is interposed between the side plates 12a and 12b of the sub tray 11 and mounted on the shelves 14a and 14b such that these trays 10 and 11 can be detached from each other.

Figure 3:
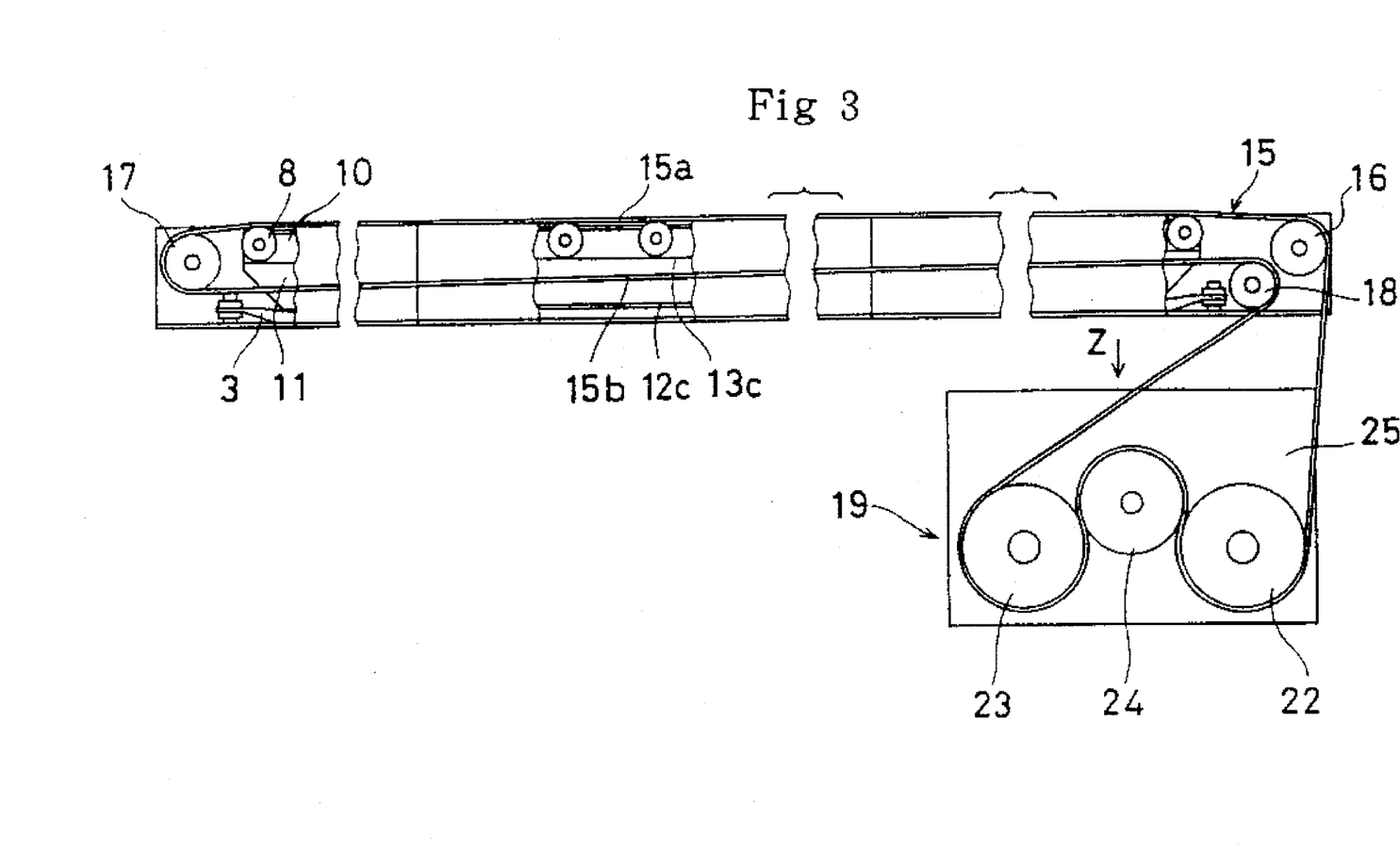
FIG. 3 is a section taken along line Y—Y of FIG. 1.

Over the main tray 10 of the self-driven liftup conveyor 1B, as shown in FIG. 3, there is placed the belt 15 which is extended all over the length. The belt 15 is an endless belt which has its upper forward belt half 15a made to run on the rollers 8 of the main tray 10 and on turn rollers 16 and 17, as located at the two end portions thereof, and its lower backward belt half 15b threaded through the passage between the bottom plate 13c of the main tray 10 and the bottom plate 12c of the sub tray 11 while ordinarily taking a rest on the bottom plate 12c of the sub tray 11, as shown in FIG. 2.

Figure 4:
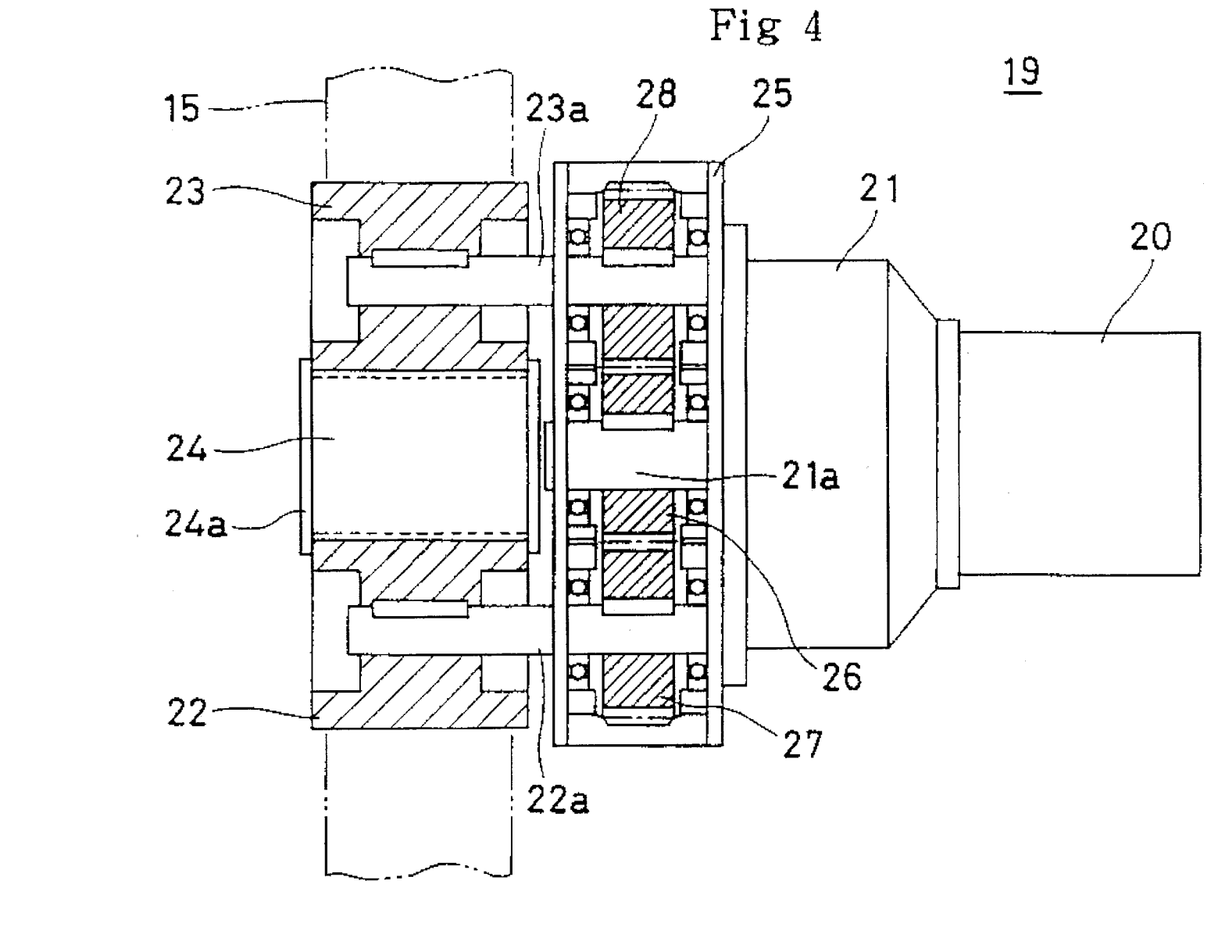
FIG. 4 is a partial section taken in a direction Z of FIG. 3.

In FIGS. 3 and 4, the reference numeral 19 designates the drive means which is disposed at the rear portion of the bed. This drive means 19 is constructed to include a motor 20, a reduction gear mechanism 21, drive rollers 22 and 23 and a pressure roller 24 as its main components. The detail of this drive means 19 will be described with reference to FIG. 4 presenting a partial section, as taken in the direction Z of FIG. 3. The motor 20 is equipped with the reduction gear mechanism 21, which is attached to a base box 25. This base box 25 is fixed in a suitable position of the vehicular body and is the gear box, from which are protruded the output shafts 22a and 23a of gears 27 and 28 meshing with a gear 26 fitted on the output shaft 21a of the reduction gear mechanism 21. Specifically, the output shafts 22a and 23a are rotatably borne by their one-side bearings. In order to mount/dismount the belt 15 easily from the side, moreover, the drive rollers 22 and 23 are fitted in a parallel cantilever state on the output shafts 22a and 23a. The pressure roller 24 has flange 24a, and is held between the aforementioned drive rollers 22 and 23.

As shown in FIG. 3, moreover, the endless belt 15 is threaded along the lower face of one drive roller 22, between this drive roller 22 and the pressure roller 24, around this pressure roller 24, between the other drive roller 23 and the pressure roller 24, along the lower face of the drive roller 23 and around a guide roller 18. As a result, if the endless belt 15 is tensed at the driving time, it forces the pressure roller 24 downward of FIG. 3, so that the endless belt 15 runs on the rollers 8 of the main tray 10 without any slip while being gripped at the two positions between the drive roller 22 and the pressure roller 24 and between the drive roller 23 and the pressure roller 24. By changing the rotating directions of the motor 20, moreover, the endless belt 15 can be reciprocated on the rollers 8 of the main tray 10. Thus, even if the endless belt 15 is more or less slackened as it moves up and down, the drive means 19 having the construction described above can transmit its driving force properly to the endless belt.

Next, the airtight tubular bag 3 of FIG. 2 is charged with the compressed air, it is inflated, as indicated by double-dotted lines, so that the endless belt 15 placed on the roller tray 4 is raised to bring its retaining portions 9a and 9b into engagement with the stoppers 6a and 6b of the channel 2. Thus, the endless belt 15 has its raised position determined. Since, in this state, the endless belt 15 is above a freight stacking face FL, the freight on the freight stacking face FL has its load received by the endless belt 15 so that the freight is conveyed as the endless belt 15 reciprocates. When the compressed air in the airtight tubular bag 3 is discharged to the outside, on the other hand, the airtight tubular bag 3 is flattened to sink the endless belt 15 below the freight stacking face FL so that the endless belt 15 is freed from the load of the freight.

Thus, the construction using the airtight tubular bag 3 for moving up and down the endless belt 15 can be periodically cleaned, maintained and inspected, if necessary, because the roller tray 4 can be easily removed from the channel 2 without being extracted in the longitudinal direction. Specifically, the roller tray 4 in the lower position can be extracted in the direction ② by inclining its lefthand higher retaining portion 9a, as indicated by ①, such that the retaining portion 9a avoids the stopper 6a. With the roller tray 4 being thus dismounted, the channel 2 is internally cleaned. On the other hand, the roller tray 4 can be easily mounted by the reverse operations. On the other hand, the roller tray 4 is constructed of the main tray 10 and the sub tray 11, which can be detached from each other. As a result, if the main tray 10 is removed, the lower backward belt half 15b is exposed to the outside so that the endless belt 15 can also be easily maintained, inspected and replaced.

With reference to FIG. 2, here will be described the structures of the free liftup conveyors 1A and 1C which are arranged at the two sides of the self-driven liftup conveyor 1B.

The free liftup conveyors 1A and 1C are given structures similar to that of the self-driven liftup conveyor 1B except that the roller tray 7 is not separated into the main and sub trays but integrated, holds multiple large rollers 8 in a rotatable manner and is not equipped with the belt. As the airtight tubular bag 3 is charged with the compressed air, it is inflated, as indicated by double-dotted lines, so that the rollers 8 borne on the roller tray 7 are raised until the roller tray 7 reaches its upper position when its retaining portions 9a and 9b come into engagement with the stoppers 6a and 6b of the channel 2. Since, in this state, the rollers 8 have risen from the freight stacking face FL, the freight above the freight stacking face FL can have its load borne by the rollers 8 and can be manually moved. By discharging the compressed air from the airtight tubular bag 3 to the outside, on the other hand, the airtight tubular bag 3 is flattened to bring the rollers 8 below the freight stacking face FL so that the freight is left on the freight stacking face FL.

Especially as shown in the piping line of FIG. 1, the roller trays 4, 7 of the self-driven liftup conveyor 1B and the two side free liftup conveyors 1A and 1C can be moved up and down selectively in an independent manner or altogether by the operations of the control box 29. In the present embodiment, moreover, the control box 29 can make such controls that the roller trays 7 of the free liftup conveyors 1A and 1C can be moved up and down together whereas the roller tray 4 of the self-driven liftup conveyor 1B can be selectively moved up and down at its three longitudinal portions respectively, i.e., its front, middle and rear portions.

Incidentally, the pressures of the compressed air to be fed to the airtight tubular bag 3 of the central self-driven liftup conveyor 1B and the airtight tubular bags 3 of the two side free liftup conveyors 1A and 1C can be so changed that the airtight tubular bag 3 of the center one 1B can be charged with the compressed air under a lower pressure than that of the compressed air to be fed to the airtight tubular bags 3 of the two side ones 1A and 1C. If, in this state, the freight is placed on the rollers, the roller tray 4 of the central self-driven liftup conveyor 1B slightly sinks so that the freight has its load borne by the roller trays 7 of the two side free liftup conveyors 1A and 1C. As a result, no excessively heavy load but the load necessary for conveying the freight is applied to the belt 15 so that the durability of the belt 15 is remarkably improved. The construction thus changing the pressures of the compressed air for the airtight tubular bags 3 can be modified such that the airtight tubular bag 3 of the self-driven liftup conveyor 1B is given a diameter smaller than that of the airtight tubular bags 3 of the free liftup conveyors 1A and 1C.

Here will be described the automatic loading/unloading operations of the vehicular liftup conveyor which is constructed by using the aforementioned self-driven liftup conveyor. First of all, at the freight loading time, the airtight tubular bags 3 of the self-driven liftup conveyor 1B and the free liftup conveyors 1A and 1C are charged with the compressed air. Then, the rear portion of the bed is loaded with the pallet carrying the freight by the fork lift. The pallet is supported by the two side free liftup conveyors 1A and 1C while having their lower faces pushed by the belt 15 which is made to run on the central self-driven liftup conveyor 1B.

When the belt 15 is then moved forward of the bed by the operation of the control box 29, the pallet is moved forward of the bed, while rolling on the rollers 8 of the free liftup conveyors 1A and 1C, by the frictional force established between the belt 15 and the pallet. When the pallet is moved to the front by one palletload, the run of the endless belt 15 is interrupted, and the bed is loaded at its rear portion with the pallet by the fork lift. By repeating these operations, the bed is loaded with the freight. When the compressed air in the airtight tubular bags of the self-driven liftup conveyor 1B and the free liftup conveyors 1A and 1C is discharged at the end of the loading operation, the pallets are placed on the freight stacking face. On the other hand, the freight can be unloaded by reversing the operations described above.

Incidentally, the embodiment thus far described is exemplified by the construction in which the two free liftup conveyors 1A and 1C are arranged along the sides of the self-driven liftup conveyor 1B. However, the construction can be modified such that the two rows of self-driven liftup conveyors 1B are used in one unit while omitting the free liftup conveyors 1A and 1C.

Moreover, the self-driven liftup conveyor 1B has its application not only to the bed of a truck, but also can be applied to the freight stacking face of a warehouse.

Thus, according to the self-driven liftup conveyor of the present invention, the belt is reciprocated to load/unload the freight while being raised from the freight stacking face, and is sunk below the freight stacking face when the freight is stacked. As a result, the freight has its load borne by the belt only when it is loaded/unloaded, so that the belt can have its durability far drastically improved than that of the case in which it is subjected to the freight load at all times including the time period while the freight is being stacked. Moreover, the self-driven liftup conveyor may have a smaller size in width than that of the freight to be stacked so that the entire construction can be produced at a lower cost.

Thanks to the endless structure of the belt, furthermore, the freight can be loaded/unloaded by reciprocating the endless belt by the single drive means so that the entire liftup conveyor can be made lighter than that of the prior art. Furthermore, the roller tray is constructed of the main tray and the sub tray for placing the main tray removably so that the endless belt can have its lower backward half threaded through the passage between the sub tray and the main tray. As a result, the endless belt can be easily inspected and replaced merely by removing the main tray. Furthermore, since the drive means is constructed of the combination of the driver rollers and the pressure roller, the belt can be easily prevented from slipping even if it is endless.

With reference to FIGS. 5 to 9, here will be described an embodiment of the truck freight loader/unloader using the self-driven liftup conveyor of the present invention.

Figure 5:
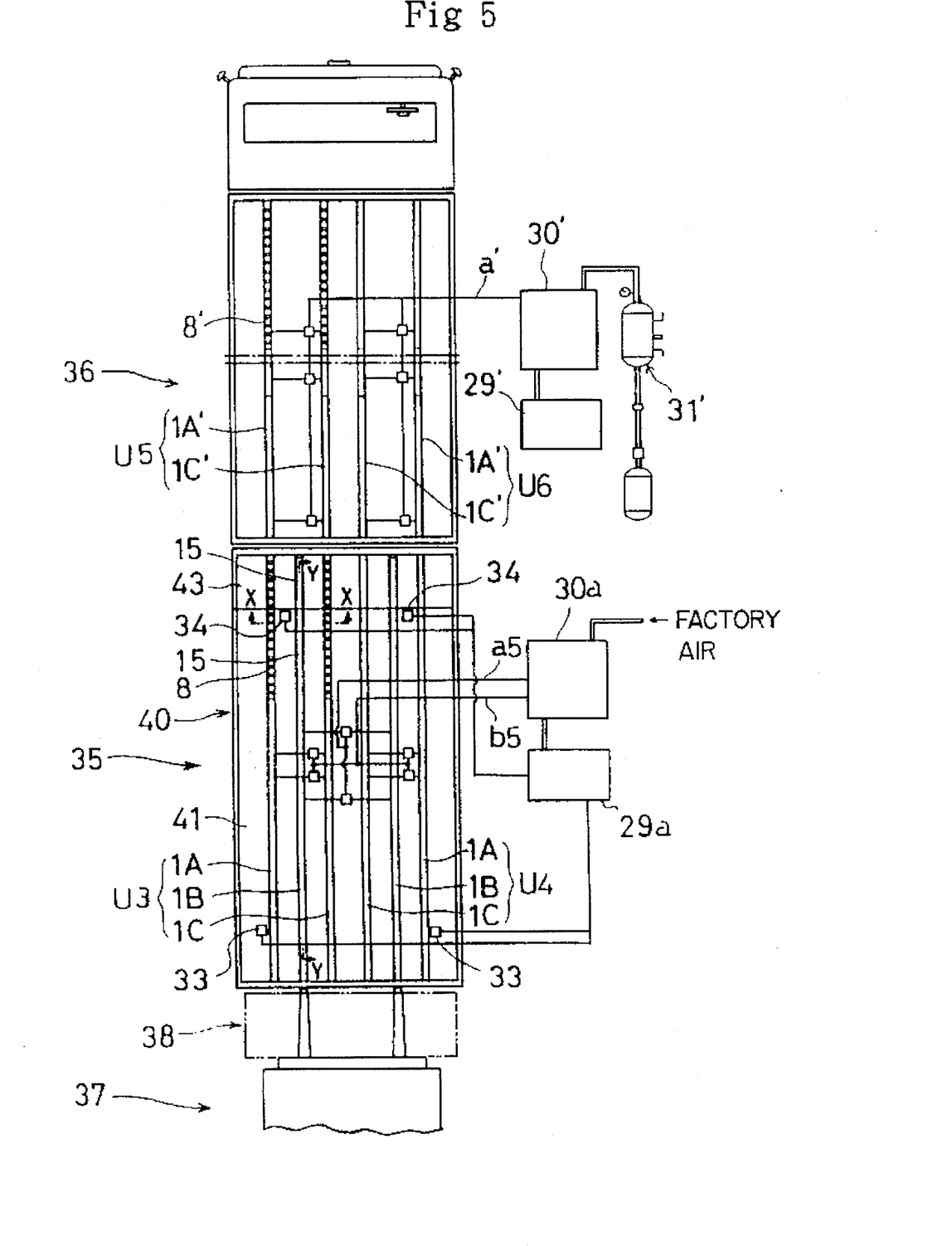
FIG. 5 is a top plan view showing a freight loading/unloading system for a truck using a truck freight loader/unloader of the present invention.

In FIG. 5: reference numeral 35 designates the truck freight loader/unloader; numeral 36 designates a truck bed connected to one end of the truck bed loader/unloader 35; and numeral 37 designates transport means such as a fork lift for the other end of the truck freight loader/unloader 35. These construct the truck freight loading/unloading system for loading the truck bed 36 with a freight 38 and unloading it.

Figure 6:
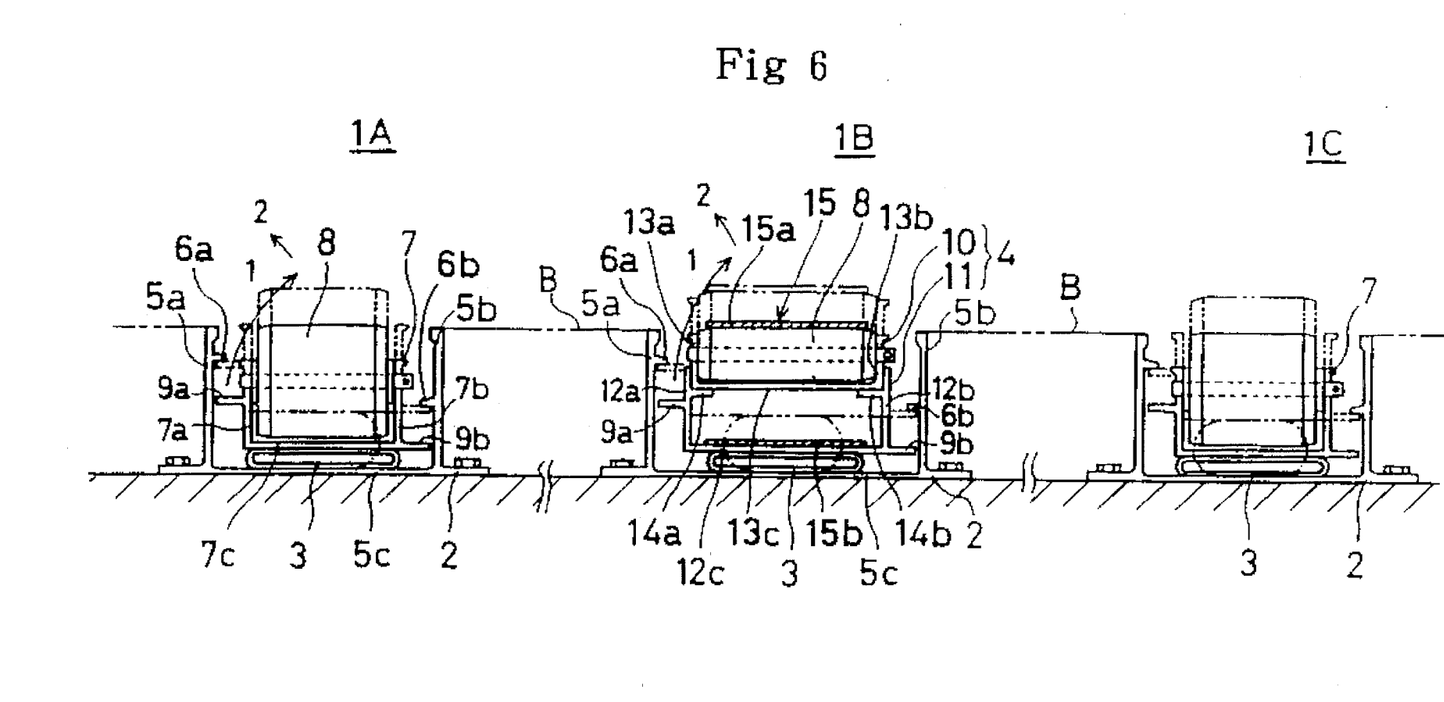
FIG. 6 is a section taken along line X—X of FIG. 5.
Figure 7:
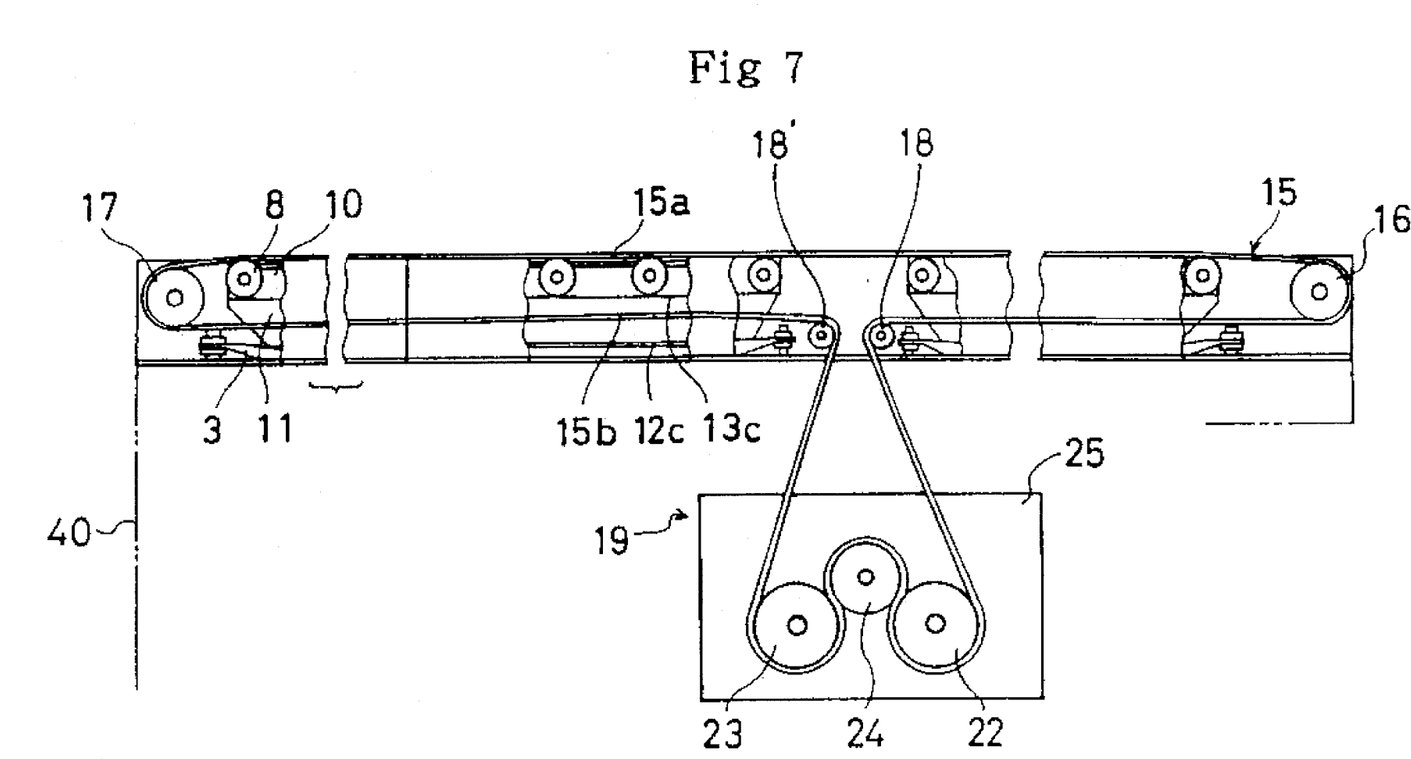
FIG. 7 is a section taken along line Y—Y of FIG. 5.

The truck freight loader/unloader 35 described above is arranged with two conveyor units U3 and U4 on a platform which is fixedly constructed on the ground or the like. Each of these conveyor units U3 and U4 is arranged with three parallel conveyor units, i.e., the central self-driven liftup conveyor 1B and the two side free liftup conveyors 1A and 1C. These liftup conveyors 1A, 1B and 1C are similar to those which have been described with reference to FIG. 2. What is different from those of FIG. 2 is located in that the upper face B of the channel 2 provides the freight stacking face, as shown in FIG. 6, and in that the drive means 19 for the self-driven liftup conveyor 1B is disposed generally at the center of the platform 40, as shown in FIG. 7.

Moreover, the self-driven liftup conveyor 1B and the free liftup conveyors 1A and 1C are separated in connection with a later-described tilting upper face portion, and the airtight tubular bags are connected in series by piping components such as the not-shown synthetic resin tubes. Still moreover, these airtight tubular bags are separated with suitable lengths, as into the front and rear portions in the vicinity of the center in the shown embodiment.

An air pipe a5 for the airtight tubular bags of the self-driven liftup conveyor 1B and an air pipe b5 for the airtight tubular bags of the free liftup conveyors 1A and 1C are connected to an air control unit 30a. This air control unit 30a is so controlled by a control box 29a that the compressed air under a desired pressure can be fed to the airtight tubular bags from the factory air source or discharged. Moreover, a stationary upper face portion 41 is equipped, as located at this side of the tilting upper face portion 43 forming one end side of the platform 40, with stoppers 34 and 34 for being protruded and contracted from the freight staking face, and, as located at the other end of the platform 40, with limit switches 33 and 33 for detecting the presence of the freight 38. These stoppers 34 and 34 and limit switches 33 and 33 are connected with the control box 29a. Of these, the stoppers 34 and 34 are provided for preventing the freight 38 from slipping down from the one end portion, and the limit switches 33 and 33 are provided for detecting the freight 38 to move it forward.

Figure 8A:
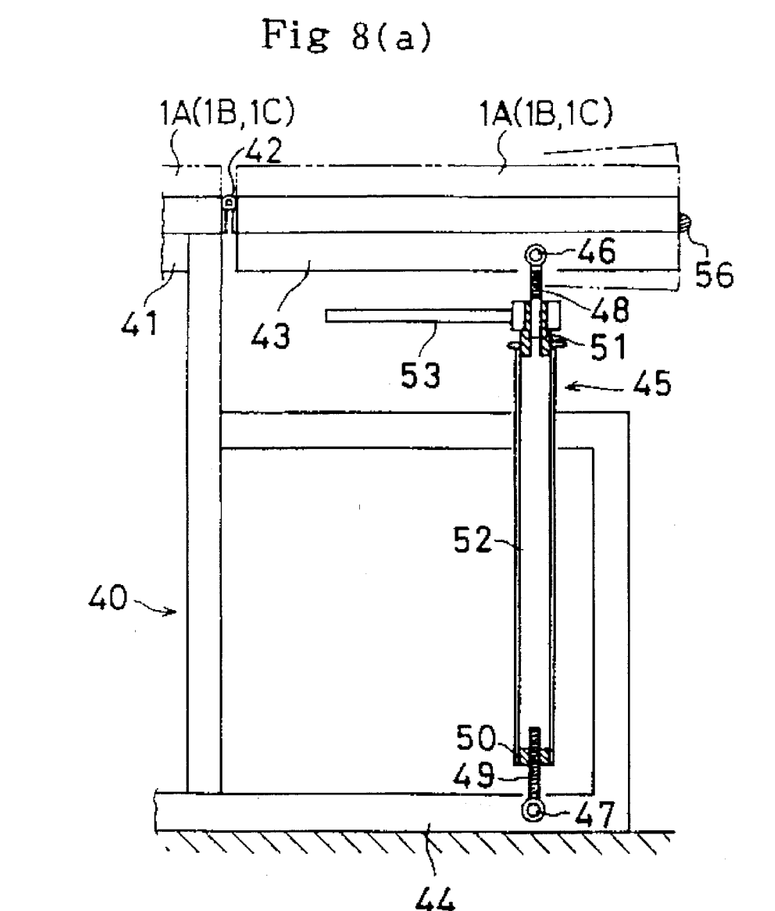
FIGS. 8(a) and 8(b) present views showing a connecting portion of the freight loader/unloader to a truck bed.
Figure 8B:
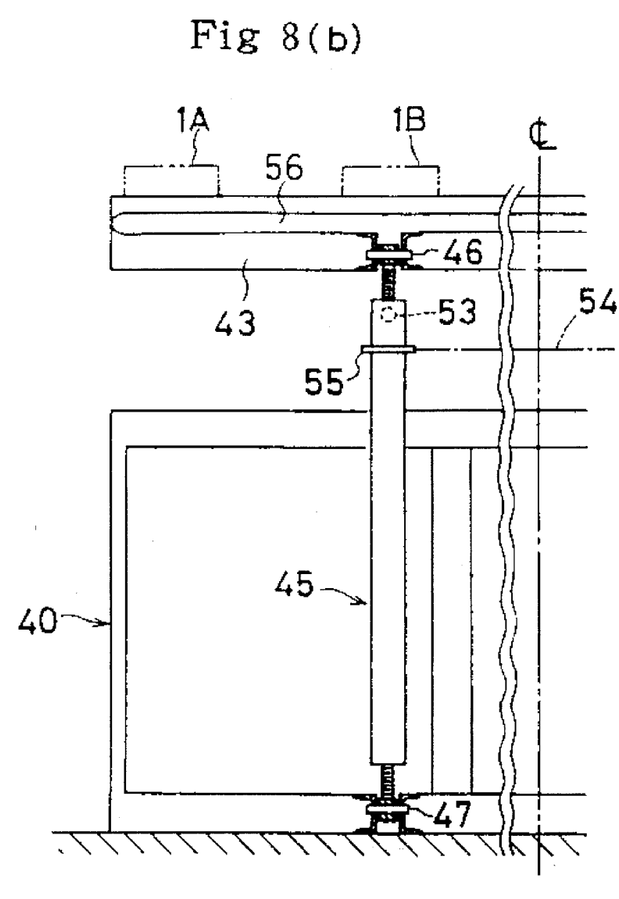

Here will be described a structure of the platform 40 with reference to FIGS. 8(a) and 8(b). FIG. 8(a) presents a side view of the leading end of the platform, and FIG. 8(b) presents a front elevation of the leading end of the platform. This platform 40 has a welded frame structure composed of the stationary upper face portion 41 and the tilting upper face portion 43 connected to the stationary upper face portion 41 with a hinge 42. On these stationary upper face portion 41 and tilting upper face portion 43, there are arranged the self-driven liftup conveyor 1B and the free liftup conveyors 1A and 1C. Between the tilting upper face portion 43 and the lower face base portion 44, there are disposed two sets of turn-buckles 45 which are symmetric to each other with respect to the centerline. Each of the turn-buckles 45 is composed of threaded rods 48 and 49 hinged in a rocking manner on pins 16 and 47, and a pipe 52 in which are fitted nut portions 50 and 51 to be screwed on those threaded rods 48 and 49, and a ratchet handle 53 for the nut portion 50. Incidentally, the pipes 52 of the two sets of turn-buckles 45 can be synchronously turned by a chain 54 and a sprocket 55, but only one of them is equipped with the ratchet handle 53.

This ratchet handle 53 can have its turning directions switched to shorten the turn-buckle 45, if turned to screw the threaded rods 48 and 49 into the nut portions 50 and 51, so that the tilting upper face portion 43 is tilted down forward. If the ratchet handle 53 is turned to screw the threaded rods 48 and 49 out of the nut portions 50 and 51, the turn-buckle 45 is elongated to tilt up the tilting upper face portion forward. Incidentally, the tilting upper face portion 43 is preferably equipped with a cushion member 56 at its leading end.

Thus, the leading end portion of the platform 40 can be tilted, whereby the platform 40 is intended to smoothly merge into the truck bed even if the height of the truck bed is different by about several tens millimeters in dependence upon the bed structure. The tilting upper face portion 43 in its horizontal position may preferably be higher by 20 to 30 mm than the average height of the truck bed.

With reference to FIG. 5, here will be described the structure of the truck bed to be connected to one end of the truck freight loader/unloader 35. In the floor of the bed, there are arranged in parallel roller units U5 and U6 which are equipped with free liftup conveyors 1A' and 1C' having the same construction as that of the free liftup conveyors 1A and 1C of the truck freight loader/unloader 35. Since the operator stands on the bed, the freight stacking face is formed with the floor. Moreover, the lift means is preferably exemplified by using the airtight tubular bags 3. This is because the roller units U5 and U6 are light and low so that the reduction of the carrying capacity is decreased. Like the foregoing truck freight loader/unloader 35, moreover, an air pipe a' for the airtight tubular bags is piped from an air control unit 30', which is so controlled by a control box 29' that the compressed air under a desired pressure can be fed from a pressure air source 31' to the airtight tubular bags 3 or discharged from the airtight tubular bags 3. Incidentally, the truck bed 36 to be connected to one end of the truckloader/unloader 35 described above may be provided with the vehicular liftup conveyor which is equipped with the self-driven liftup conveyor of the present invention shown in FIG. 2. At the other end of the aforementioned truck loader/unloader 35, there is located the fork lift 37 which is ready for loading the freight 38. If the loaded freight is detected by the limit switch 33, the self-driven liftup conveyor 1B is driven. If the limit switch 33 is turned OFF, the drive of the self-driven liftup conveyor 1B is interrupted to feed one freight forward.

Incidentally, the aforementioned truck loader/unloader 35 is equipped with the free liftup conveyors 1A and 1C at the two sides of the self-driven liftup conveyor 1B, but the free liftup conveyors 1A and 1C may be replaced by the mere free roller rows having no liftable roller.

Figure 9A:
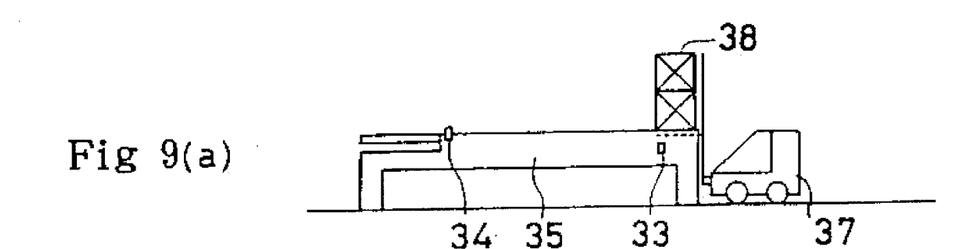
FIGS. 9(a), 9(b), 9(c) and 9(d) present operation diagrams showing the truck freight-loading system of the present invention.
Figure 9B:
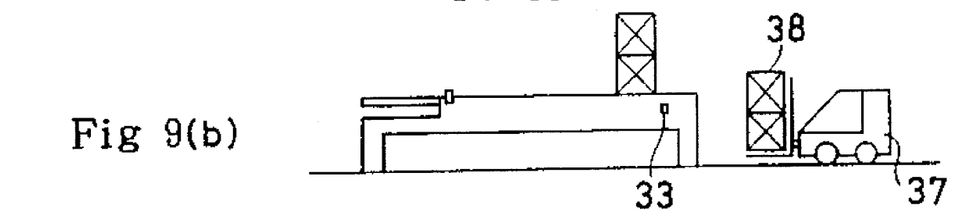
Figure 9C:
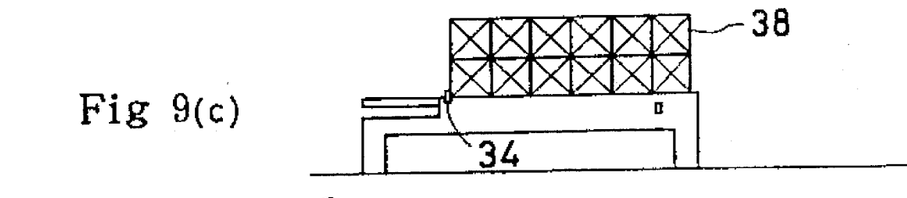
Figure 9D:
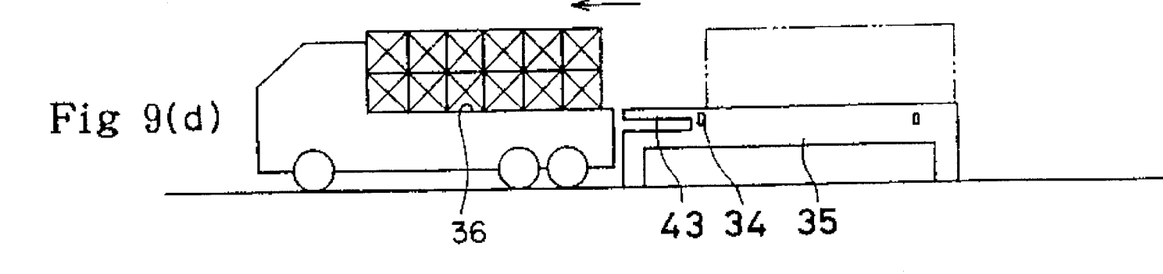

With reference to FIGS. 9(a) to 9(d), here will be described the truck freight loading system using the aforementioned loader/unloader 35. FIGS. 9(a) to 9(c) illustrate the freight stacking steps, and FIG. 9(d) illustrates the freight loading step.

First of all, the airtight tubular bags of the self-driven liftup conveyor 1B and the free liftup conveyors 1A and 1C of FIG. 6 are charged with the compressed air so that the rollers 8 and the belt 15 are raised from the freight stacking face B. Then, the stoppers 34 of FIG. 5 are also protruded from the freight stacking face. In this state, the freight 38 carried on the not-shown pallet is transferred by the fork lift 37 to the other end of the truck freight loader/unloader 35, as shown in FIG. 9(a). Then, the freight 38 has its load borne by the free liftup conveyors 1A and 1C of FIG. 6 and its lower face carried on the belt 15 of the self-driven liftup conveyor 1B so that it can be conveyed by the endless belt 15 driven. If the limit switch 33 detects the freight 38, the endless belt 15 of FIG. 6 is driven after a lapse of a time period determined by the timer so that the freight 38 is rolled to move forward on the rollers of the free liftup conveyors 1A and 1C of FIG. 6 by the force of friction established with the endless belt 15.

When the limit switch 33 is turned OFF, the drive of the endless belt 15 of FIG. 6 is interrupted to establish the state of FIG. 9(b). By repeating the operations of the fork lift 37 to transfer the freight 38 to the other end of the freight loader/unloader 35, the freights are sequentially stacked on the loader/unloader 35 until there is stacked a group of freights 38 corresponding to one truck while being stopped by the stoppers 34, as shown in FIG. 9(c). If a gap is found between the stacks of freights 38, the compressed air in the airtight tubular bags 3 of the self-driven liftup conveyor 1B of FIG. 6 is discharged to lower the endless belt 15 below the freight stacking face B. In this state, the freights 38 are borne exclusively by the free liftup conveyors 1A and 1C of FIG. 6. If the end of the stacks of freights 38 is then pushed by the fork lift, the stacks of freights 38 are easily slid on the free liftup conveyors 1A and 1C to rearrange the freight group having no gap. Incidentally, in case sufficient time is left before the loading on the track bed, the free liftup conveyors of FIG. 6 are left in their lower positions. Then, the freights 38 are left on the freight stacking face B so that they are safely kept from slipping down.

When the truck bed 36 comes in, it is connected at its back to the truck freight loader/unloader 35. At this time, the inclination of the tilting upper face portion 43 of FIG. 8 is adjusted to the level of the truck bed by the ratchet handle 53. Then, the rollers 8 and the belt 15 of the self-driven liftup conveyor 1B and the free liftup conveyors 1A and 1C of FIG. 8 are protruded again from the freight stacking face B. Moreover, the stoppers 34 are also sunk. If the endless belt 15 of the self-driven liftup conveyor of FIG. 6 is then driven, the grouped freights 38 are pushed as they are on the tilting upper face portion 43 to the truck bed 36. This truck bed is also equipped with the free liftup conveyors 1A' and 1C', as shown in FIG. 5, so that the grouped freights 38 are loaded as they are on the truck bed.

Figure 10A:
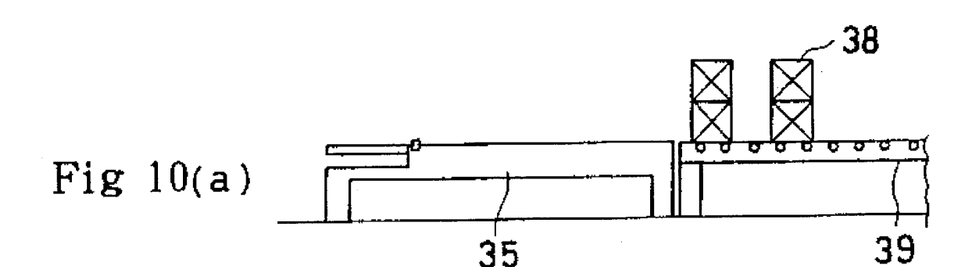
FIGS. 10(a), 10(b), 10(c) and 10(d) present operation diagrams showing another truck freight loading system of the present invention.
Figure 10B:
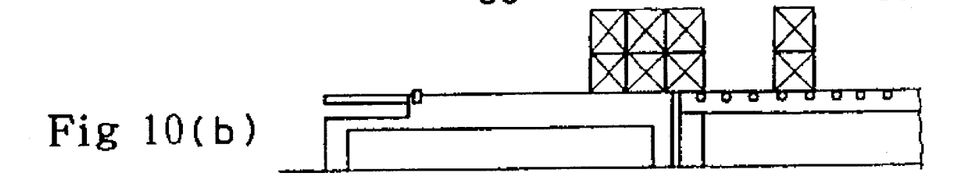
Figure 10C:
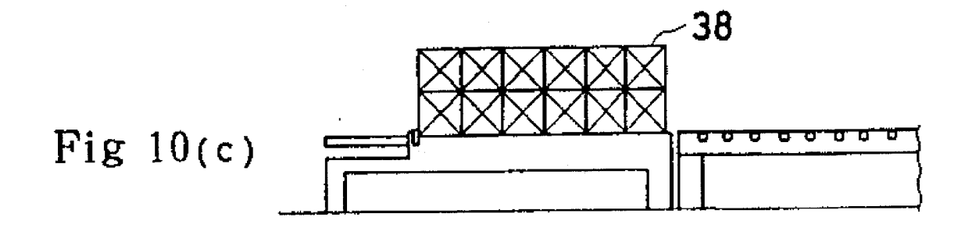
Figure 10D:
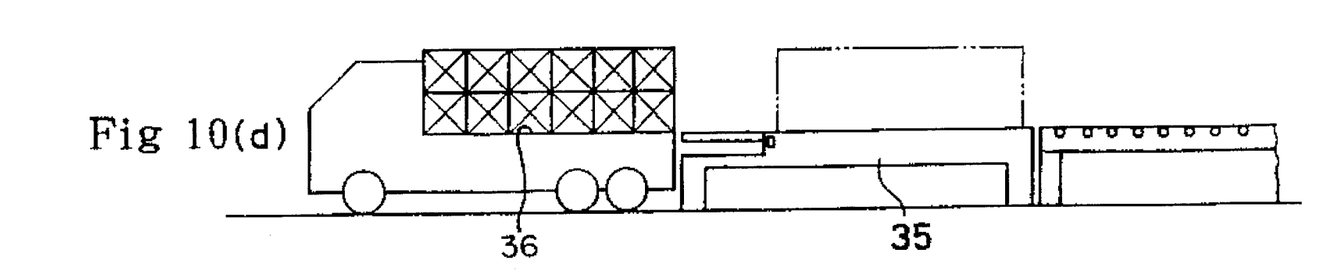

Incidentally, the operations described above are directed to the loading of the freights. If, however, the arrangement of the limit switches 33 and the stoppers 31 are longitudinally reversed, the freights can be manually unloaded one by one and loaded on the loader/unloader 35. Then, the freights in the truck bed can be once stacked as a whole on the loader/unloader 35 by sequentially driving the endless belt 15 and then transferred to a desired place by the fork lift FIGS. 10(a) to 10(d) are diagrams illustrating another loading operation. What is different from the operation of FIG. 9 is located in that a conveyor 39 is fixedly connected in place of the fork lift to the other end of the truck freight loader/unloader 35. Since, in this case, the freights 38 are sequentially conveyed on the conveyor 39, the self-driven liftup conveyor 1B of FIG. 6 is lowered whereas the free liftup conveyors 1A and 1C are raised. Then, the freights 38 are loaded in the feeding order so that they automatically take the states, as illustrated in FIG. 10(a)→FIG. 10(b)→FIG. 10(c). When the truck bed 36 is connected at its back to one end of the truck freightloader/unloader 35, the self-driven liftup conveyor 1B of FIG. 6 is raised, and the endless belt 15 is driven to force the grouped freights 38 altogether into the truck bed.

According to the truck freight loading/unloading system thus far described, the truck freight loader/unloader 35 to be connected to the truck bed 36 is so constructed that it can stock the freights of one truck or more. When the truck bed 36 is connected to the truck freights loader/unloader 35, the freights are conveyed by the self-driven liftup conveyor of the loader/unloader 35 so that they can be loaded on or unloaded from the truck bed 36. As a result, only a single operator can load/unload the freights for a short time period to spare the man power drastically. Since, moreover, the loading/unloading mechanism for the truck bed 36 is disposed separately of the bed, the equipment for the truck bed 36 can be minimized to the free roller rows or liftup conveyors to thereby reduce the loss of the carrying capacity of the truck bed 36. Furthermore, the self-driven liftup conveyor of the truck freight loader/unloader 35 is made so vertically movable that the belt is raised together with the rollers only at the conveying time but lowered at the stacking time. As a result, most of the load for the freights is borne by the free roller rows or the free liftup conveyors, and the self-driven liftup conveyor is assigned only to the conveying operation so that its driving capacity can be made relatively small to provide a more inexpensive structure than that of the general purpose conveyor.

If, on the other hand, the free roller rows of this truck freight loader/unloader 35 are exemplified by the vertically movable free liftup conveyors, they can be lowered at the freight stacking time to block the movement of the freights completely. If, moreover, the connecting portion of the truck freight loader/unloader 35 to the truck bed 36 is made tiltable, the freights can be smoothly loaded on and unloaded from even the trucks having different heights.

Furthermore, the truck freight loading/unloading system of the present invention is equipped with either the vertically movable free liftup conveyors even on the truck bed or the vehicular liftup conveyor having the self-driven liftup conveyor of the present invention and is combined with the conveyor means such as the fork lift or the conveyor. As a result, the loading of the freights on the truck bed can be accomplished for a short time period when the truck comes in, and the freights of one truck can be stacked on the truck freight loader/unloader 35 by the fork lift or the conveyor by the time a next truck comes in. Thus, it is possible to shorten the truck standby time to the minimum and to effect the stacking of the freights on the truck freight loader/unloader 35 in accordance with the flow of the freights to thereby to enhance the physical distribution efficiency.

INDUSTRIAL APPLICABILITY

The self-driven liftup conveyor of the present invention has such a simple structure that the belt can be raised together with the rollers at the loading/unloading time to act as a belt conveyor for conveying the freights and can be lowered together with the rollers at the freight stacking time into a state in which it is independent of the weight of the freights. As a result, the self-driven liftup conveyor of the present invention is optimized as a compact belt conveyor having a drastically improved durability and acting to stack the freights.

Moreover, the vehicular liftup conveyor of the present invention makes use of the aforementioned self-driven liftup conveyor of the present invention so that it is optimized for the truck bed which is required to move the freights automatically in the bed.

Still moreover, the truck freightloader/unloader of the present invention makes use of the aforementioned self-driven liftup conveyor of the present invention so that it is optimized for an auxiliary unit for loading/unloading the freights of one truck altogether.

Furthermore, the truck freight loading system of the present invention can load the truck bed with the freights after the freights have been preliminarily stacked on the aforementioned truck freight loader/unloader so that it is optimized for an automatic system for effecting the loading of the freights on the truck bed for a short time period.

We claim:

1. A self-driven liftup conveyor comprising:
    a channel having a bottom plate and first and second opposing side plates;
    a main roller tray having a plurality of rollers rotatably disposed therein;
    a sub-roller tray accommodated in said channel, said sub-roller tray having a bottom plate and first and second opposing side plates, said sub-roller tray further comprising shelves which run along an inner surface of each of said sub-roller tray side plates, said shelves being at a same elevation for retaining said main roller tray on said sub-roller tray, said main roller tray being removable from said sub-roller tray;
    an endless belt trained over said rollers, said endless belt having a return side which runs between said sub-roller tray and said main roller tray;
    drive means for reciprocating said endless belt; and
    lift means interposed between said sub-roller tray and said channel for moving said main roller tray and said sub roller tray together with said endless belt trained over said rollers vertically with respect to a freight stacking face.

2. A self-driven liftup conveyor according to claim 1, wherein:
    said channel side plates have stoppers which run along an inner surface of each of said channel side plates, the stopper of a first channel side plate of said channel side plates being at a higher elevation than the stopper of a second channel side plate of said channel side plates;
    said sub-roller tray has retaining portions which run along an outer surface of each of said sub-roller tray side plates, the retaining portion of a first sub-roller tray side plate of said sub-roller tray side plates being at a higher elevation than the retaining portion of a second sub-roller tray side plate of said sub-roller tray side plates for regulating a raised position of the sub-roller tray when the retaining portions abut against said stoppers; and
    said sub-roller tray is tiltably removable from said channel.

3. A self-driven liftup conveyor according to claim 1, wherein said lift means includes an airtight tubular bag placed on the bottom plate of the channel for raising or lowering said main roller tray and said sub-roller tray by charging or discharging compressed air into an inside of said airtight tubular bag.

4. A self-driven liftup conveyor according to claim 1, wherein said drive means includes drive rollers and a pressure roller adapted to come into and out of contact with said drive rollers, and wherein the return side of said endless belt runs on said drive rollers and said pressure roller.

5. A self-driven liftup conveyor according to claim 4, wherein each of said drive rollers is fitted in a cantilevered state on one end side of a shaft which has a bearing on its other end side so as to make said drive rollers rotatable.

6. A vehicular liftup conveyor comprising:
    a liftup conveyor mounted on a bed of a truck; and
    a self-driven liftup conveyor mounted on the bed of the truck along said liftup conveyor;
    wherein said self-driven liftup conveyor includes:
    a channel having a bottom plate and first and second opposing side plates;
    a main roller tray having a plurality of rollers rotatably disposed therein;
    a sub-roller tray accommodated in said channel, said sub-roller tray having a bottom plate and first and second opposing side plates, said sub-roller tray further comprising shelves which run along an inner surface of each of said sub-roller tray side plates, said shelves being at a same elevation for retaining said main roller tray on said sub-roller tray, said main roller tray being removable from said sub-roller tray;
    an endless belt trained over said rollers, said endless belt having a return side which runs between said sub-roller tray and said main roller tray;
    drive means for reciprocating said endless belt; and
    lift means interposed between said sub-roller tray and said channel for moving said main and sub-roller trays together with said endless belt trained over said rollers vertically with respect to a freight stacking face; and
    wherein said liftup conveyor includes:
    a further channel having a further bottom plate and two further side plates;
    a further roller tray accommodated in said further channel having a plurality of rollers rotatably disposed therein; and
    a further lift means interposed between said further roller tray and said further channel for moving said further roller tray vertically with respect to said freight stacking face.

7. A vehicular liftup conveyor of claim 6, wherein:

said channel side plates include stoppers which run along an inner surface of each of said channel side plates, the stopper of a first channel side plate of said channel side plates being at a higher elevation than the stopper of a second channel side plate of said channel side plates;

said sub-roller tray has retaining portions which run along an outer surface of each of said sub-roller tray side plates, the retaining portion of a first sub-roller tray side plate of said sub-roller tray side plates being at a higher elevation than the retaining portion of a second sub-roller tray side plate of said sub-roller tray side plates for regulating a raised position of the sub-roller tray when the retaining portions abut against said stoppers; and said sub-roller tray is tiltably removable from said channel.

8. A vehicular liftup conveyor of claim 6, wherein:

the lift means of said self-driven liftup conveyor and the further lift means of said liftup conveyor can operate independently of each other.

9. A vehicular liftup conveyor of claim 6, wherein:

the lift means of said self-driven liftup conveyor has an airtight tubular bag placed on the channel bottom plate of said self-driven liftup conveyor for raising or lowering said main and sub-roller trays of said self-driven liftup conveyor by charging or discharging compressed air into an inside of said airtight tubular bag; and the further lift means of said liftup conveyor has a further airtight tubular bag placed on the further bottom plate of said further channel of said liftup conveyor for raising or lowering said main and sub-roller trays of said liftup conveyor by charging or discharging compressed air into an inside of said further airtight tubular bag.

10. A vehicular liftup conveyor of claim 9, wherein:

a lifting force of the further airtight tubular bag of said liftup conveyor is set to be stronger than that of the airtight tubular bag of said self-driven liftup conveyor.

* * * * *

UNITED STATES PATENT AND TRADEMARK OFFICE
CERTIFICATE OF CORRECTION

PATENT NO. : 5,542,809
DATED : August 6, 1996
INVENTOR(S) : Katsuo KITA, et al.

It is certified that error appears in the above-indentified patent and that said Letters Patent is hereby corrected as shown below:

On the title page, Item [22], the PCT filing date, should read:

--[22]  PCT Filed: Apr. 4, 1994--

Also, Items [86] and [87], the PCT information, should read:

--[86]  PCT No.: PCT/JP94/00554
        §371 Date: Feb. 9, 1995
        §102(e) Date: Feb. 9, 1995

[87]  PCT Pub. No.: WO94/22748
        PCT Pub. Date: Oct. 13, 1994--

Signed and Sealed this

Nineteenth Day of November, 1996

Attest:

BRUCE LEHMAN

*Attesting Officer*   *Commissioner of Patents and Trademarks*